United States Patent Office
3,077,478
Patented Feb. 12, 1963

3,077,478
5-HYDROCARBON-AMINO-2-PYRROLIDINONES AND PIPERIDONES
Newman M. Bortnick, Oreland, and Marian F. Fegley, Mont Clare, Pa., assignors to Rohm & Haas Company, Philadelphia, Pa., a corporation of Delaware
No Drawing. Filed May 9, 1960, Ser. No. 27,528
8 Claims. (Cl. 260—326.5)

This invention deals with specific substituted pyrrolidinones and piperidinones as new compositions of matter. It further deals with a method for the preparation of these specific substituted pyrrolidinones and piperidinones.

The compounds of this invention are prepared by reacting a compound having the formula

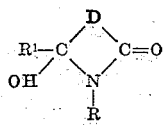

with an amine. In the above formula, the symbol R represents a hydrogen atom, an alkyl groups of one to eighteen carbon atoms, an aryl group of up to ten carbon atoms, an aralkyl group of up to twelve carbon atoms, an alkarylalkyl group of up to twenty carbon atoms, an alkoxyalkyl group of three to ten carbon atoms, a hydroxyalkyl group of two to twelve carbon atoms, and an alkylaminoalkyl group of three to eighteen carbon atoms provided that the amino group is a secondary or tertiary structure, that is non-primary. Alkyl, in the above definition, is to be construed to include cycloalkyl and alkylcycloalkyl within the range of carbon atoms previously set forth.

Typical R representations are hydrogen, methyl, ethyl, butyl, octyl, decyl, dodecyl, octadecyl, cyclopentyl, cyclohexyl, phenyl, naphthyl, benzyl, phenylethyl, phenylbutyl, methylphenyl, methoxyethyl, methoxypropyl, methoxyethyl, propoxyethyl, butoxyethyl, hydroxyethyl, hydroxypropyl, hydroxybutyl, hydroxypentyl, hydroxyoctyl, hydroxydecyl, hydroxydodecyl, ethylaminoethyl, propylaminoethyl, N,N - dimethylaminoethyl, N,N - dipropylaminopropyl, morpholinopropyl and pyrrolidinoethyl.

The symbol $R^1$ represents hydrocarbon groups of one to ten carbon atoms, preferably alkyl, arylalkyl, cycloalkyl, aryl, and alkaryl. $R^1$ may typically represent methyl, butyl, octyl, benzyl, phenylbutyl, cyclopentyl, cyclohexyl, phenyl, naphthyl, butylphenyl groups, and the like.

D is a divalent chain containing two to three carbon atoms. The carbon atoms in the D chain may have their remaining valences satisfied by hydrogen atoms, by alkyl groups whose total carbon atom content is no greater than 18, or by combinations of hydrogen atoms and alkyl groups. When D contains two carbon atoms, there are four valences to be satisfied by hydrogen atoms, alkyl groups, or combinations thereof. For instance, there may be four hydrogen atoms, four alkyl groups, three hydrogen atoms and one alkyl group, two hydrogen atoms and two alkyl groups, or one hydrogen atom and three alkyl groups. When D contains three carbon atoms, there are six valences to be satisfied by hydrogen atoms, alkyl groups, or combinations thereof and these valences may be satisfied in a way analogous to the manner described above when D contains two carbon atoms. It is also possible for the above-mentioned alkyl substituents to be joined together to form carbocyclic rings in conjunction with the D chain. When D represents a three carbon chain $R^1$ may represent a hydrogen atom in addition to the other embodiment, discussed previously.

The alkyl substituents on the carbon atoms of the D chain may have any possible spatial configurations, such as normal, iso, tertiary, and the like. These alkyl substituents may also be straight chained or cyclic. Typical of the alkyl substituents that may be used to satisfy the remaining valences of the carbon atoms in the D chain include methyl, ethyl, propyl, butyl, cyclopentyl, hexyl, cyclohexyl, octyl, decyl, dodecyl, tridecyl, tetradecyl, and octadecyl groups.

Typical of the specific substituted pyrrolidinones and piperidinones that may be employed as reactants in the present invention are 4,5-dimethyl-5-hydroxy-2-pyrrolidinone,
7a-hydroxy-3,3-pentamethylene-2,3,3a,4,5,6,7,7a-octahydroindol-2-one,
3-methyl-3,5-dipropyl-5-hydroxy-2-pyrrolidinone,
1-(2-phenylethyl)-3,3,5-trimethyl-5-hydroxy-2-pyrrolidinone,
3,3,5-trimethyl-5-hydroxy-2-pyrrolidinone,
3,5-dimethyl-3-neopentyl-5-hydroxy-2-pyrrolidinone,
1-(3-diethylaminopropyl)-3,3,5-trimethyl-5-hydroxy-2-pyrrolidinone,
1-(2-dimethylaminoethyl)-3,3,5-trimethyl-5-hydroxy-2-pyrrolidinone,
1-benzyl-3,3,5-trimethyl-5-hydroxy-2-pyrrolidinone,
1-p-tolyl-3,3,5-trimethyl-5-hydroxy-2-pyrrolidinone,
1-(3-dimethylaminopropyl)-3,5-dimethyl-3-neopentyl-5-hydroxy-2-pyrrolidinone,
1-(3-methoxypropyl)-3,3,5-trimethyl-5-hydroxy-2-pyrrolidinone,
3,5-dimethyl-3-hexyl-5-hydroxy-2-pyrrolidinone,
1-dodecyl-3,3,5-trimethyl-5-hydroxy-2-pyrrolidinone,
3,6-dimethyl-3-(2,2-dimethylpropyl)-6-hydroxy-2-piperidinone,
1-methyl-3,6-dipropyl-6-hydroxy-2-piperidinone,
1,3,3,6-tetramethyl-6-hydroxy-2-piperidinone,
1-(2-dimethylaminoethyl)-3,3,6-trimethyl-6-hydroxy-2-piperidinone,
3,3,6-trimethyl-6-hydroxy-2-piperidinone,
3,6-dimethyl-3-neopentyl-6-hydroxy-2-piperidinone,
3,6-dihexyl-3-methyl-6-hydroxy-2-piperidinone,
1-p-tolyl-3,3,6-trimethyl-6-hydroxy-2-piperidinone,
1,5,5-trimethyl-6-hydroxy-2-piperidinone,
5,5-dimethyl-4-ethyl-6-hydroxy-2-piperidinone,
3,6-di-(2-methylpropyl)-3-methyl-6-hydroxy-2-piperidinone,
1-(2-diethylaminoethyl)-5,5-dimethyl-6-hydroxy-2-piperidinone,
3,4-dimethyl-3-hexyl-6-hydroxy-2-piperidinone,
5,5-dimethyl-6-hydroxy-2-piperidinone,
spiro{3,3-dimethylbicyclo(2.2.1)heptane-2,3'-[6'-methyl-6'-hydroxy-2'-piperidinone]},
3,4,4-trimethyl-6-hydroxy-2-piperidinone,
3,5,5-trimethyl-6-hydroxy-2-piperidinone,
3,6-dibutyl-5-methyl-6-hydroxy-2-piperidinone.

The piperidinone and pyrrolidinone reactants employed in the present process may be obtained by cyclization of γ- and δ-oxonitriles. It is possible to start with γ- and δ-oxonitriles and, by cyclization and hydration, obtain the corresponding 5-hydroxy-2-pyrrolidinone and 6-hydroxy-2-piperidinone reactants. The products of this invention may then be derived by reaction with a compound having the formula $R^2NH_2$ in the presence of an alkali to be more fully described hereinafter. Thus, it is possible to go from the γ-oxonitriles and δ-oxonitriles to the specific 2-pyrrolidinones and 2-piperidinones of this invention in a rather continuous way without the necessity of separating or purifying the 5-hydroxy-2-pyrrolidinones or 6-hydroxy-2-piperidinones. It is, of course, generally desirable, from the viewpoint of yields, to employ as reactants the specific pyrrolidinones and piperidinones discussed heretofore.

The other reactant employed in the present invention is an amine. It may be a primary, a secondary, or a tertiary-alkyl primary amine and can be a monoamine or a diamine. The amines should contain from one to eighteen carbon atoms and in the case of the diamines only one amino group can be on any carbon atom. The amines that can be employed include alkylamines, arylamines, arylalkylamines, diaminoalkanes, and aromatic diamines.

When a monoamine is employed as the reactant, the product will have the formula

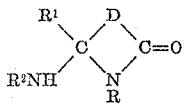

When a diamine is employed, the product has the formula

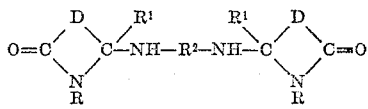

When a hydroxyamine is employed, the product has the formula

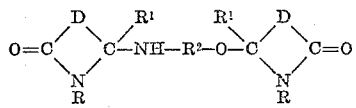

Typical of the amine reactants that may be employed are methylamine, ethylamine, butylamine, hexylamine, dodecylamine, octadecylamine, isopropylamine, 2-aminobutane, isobutylamine, tert-butylamine, 2-aminooctane, cyclohexylamine, 4-methylcyclohexylamine, 2-amino-2,2,1-bicycloheptane, 2,2,1-bicycloheptan-2-yl-methylamine, benzylamine, phenylethylamine, phenylbutylamine, phenyldodecylamine, aniline, naphthylamine, m-phenylenediamine, p-phenylenediamine, m-xylylenediamine, p-xylylenediamine, ethylenediamine, 1,2-propylenediamine, diethylenetriamine, triethylenetetramine, 1,3-diaminopropane, 1,6-diaminohexane, 1,10-diaminodecane, 2-dimethylaminoethylamine, 3-diethylaminopropylamine, 3-morpholinopropylamine, 2-ethylamino-3-hydroxypropylamine, propanolamine, 2-ethoxyethylamine, and the like.

The present reaction is conducted in the presence of a basic catalyst ranging in amounts from 0.005% by weight to stoichiometric amounts, preferably employing amounts of about 0.1 to 25% by weight of the total weight of the reactant. In the present instance, the amine reactant may also serve advantageously as a catalyst by simply supplying a stoichiometric amount of the amine in the reaction itself. It is frequently desirable to merely employ an amount of the amine reactant in excess of that required to actually react with the pyrrolidinone or piperidinone or piperidinone reactant. In some instances, it may be advantageous to use a basic catalyst different from the amine reactant. In such instances, there may be employed alkali metals and their carbonates, alkali and alkaline earth metal lower alkoxides, oxides, and hydroxides, and quaternary ammonium bases. Actually, there may be employed as a catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium carbonate, potassium carbonate, benzyltrimethylammonium hydroxide, dibenzyldimethylammonium hydroxide, dodecenyltriethylammonium hydroxide, and the like.

Temperatures in the range of 35° to 150° C., preferably 50° to 110° C. are employed. The reaction is conducted within the temperature ranges at a temperature where the amine reactant $R^2NH_2$ is liquid or molten. The reaction may be conducted without the use of a solvent, but a solvent is frequently desirable if the amine reactant $R^2NH_2$ is neither liquid nor molten within the stated temperature ranges. If the solvent is desired, there may be used water, hydrocarbons, secondary or tertiary alcohols, ethers, nitriles, secondary amides and the like and preferably one that forms an azeotrope with water. Typically these may be benzene, toluene, heptane, isooctane, isopropyl alcohol, secondary butanol, tertiary butanol, methyl isobutylcarbinol, diisopropyl ether, dibutyl ether, acetonitrile, isobutyronitrile, dimethylformamide, dimethylacetamide, and the like.

The products obtained are pasty or crystalline solids or viscous liquids which are isolated generally by simply stripping off the lighter components. This is particularly so when only small amounts of catalyst are used. Otherwise, the catalyst is neutralized with acids, such as hydrochloric and sulfuric, and the products are separated from the salts by extraction with suitable solvents which dissolve the product but not the salts, such as benzene, and the like.

The products of this invention are useful herbicides and insecticides. They are especially effective in controlling armyworms when employed in the usual concentrations according to standard procedures. Typically, there may be used from 2 to 4 pounds of a compound of this invention per 100 gallons of spray mix.

The present invention may be more fully understood from the following examples which are offered by way of illustration and not by way of limitation. Parts by weight are used throughout.

*Example 1*

5-hydroxy-3,3,5-trimethyl-2-pyrrolidinone (30 parts) and benzylamine (60 parts) are combined and heated at 90° to 92° C. for 17 hours with stirring. On cooling, most of the product solidifies. The solid is filtered and washed with heptane. Recrystallization from heptane gives the analytical sample, M.P. 110° to 111° C. The product contains 72.45% carbon (theoretical 72.37%), 8.53% hydrogen (theoretical 8.68%), and 12.12% nitrogen (theoretical 12.06%). The product has a molecular weight of 235 (theoretical 232). The infrared absorption spectrum of this material indicates the presence of the structural unit NHC=O in a five-membered ring structure.

The product is identified as 5-benzylamino-3,3,5-trimethyl-2-pyrrolidinone (30 parts).

In a similar fashion are prepared 5-octylamino, 5-butylamino, 5-vinoxyethylamino, and 5-(3-dimethylaminopropyl)amino-3,3,5-trimethyl-2-pyrrolidinone from 5-hydroxy-3,3,5-trimethyl-2-pyrrolidinone and the corresponding amines. In a similar manner 5-benzylamino and 5-cyclohexylamino-4,5-dimethyl-2-pyrrolidinone are prepared from 5-hydroxy-4,5-dimethyl-2-pyrrolidinone and the corresponding primary amines.

*Example 2*

Benzylamine (21 parts), 5-hydroxy-3,3,5-trimethyl-2-pyrrolidinone (28.6 parts), and benzene (50 parts) are boiled under reflux until water (3.5 parts) separates. Volatile components are stripped under reduced pressure to a pot temperature of 80° C. (1.0 mm. absolute pressure) and the residue is recrystallized from heptane. The yield of 5-benzylamino-3,3,5-trimethyl-2-pyrrolidinone is 90%. This procedure is the preferred one for those amines which boil above about 100° C. Thus, 5-cyclohexylamino-3,5-dimethyl-3-(2,2-dimethylpropyl)-2-pyrrolidinone is prepared from cyclohexylamine and 5-hydroxy-3,5-dimethyl-3-(2,2-dimethylpropyl)-2-pyrrolidinone, and 5-octadecylamino-3-methyl-3,5-dihexyl-2-pyrrolidinone is obtained from octadecylamine and 5-hydroxy-3,5-dihexyl-3-methyl-2-pyrrolidinone.

*Example 3*

5-hydroxy-3,3,5-trimethyl-2-pyrrolidinone (57 parts), 2-phenylethylamine (49 parts), and toluene (100 parts)

are treated according to the method of Example 2. The product is a crystalline solid, M.P. 69° to 71.5° C. when recrystalized from petroleum ether. The product contains 11.00% nitrogen (theoretical 11.35%) and has a neutral equivalent of 245 (theoretical 246). The product has a formula of $C_{15}H_{22}N_2O$ and is identified as 5-phenylethylamino-3,3,5-trimethyl-2-pyrrolidinone.

*Example 4*

A mixture of 2-phenylethylamine (69 parts) and 5-methyl-5-hydroxy-2-pyrrolidinone (50 parts) is combined and allowed to stand in a stoppered flask for several days. Crystals begin to separate after two days. After two more days, the reaction mixture is filtered and the product, 5-(2-phenylethyl)-amino-5-methyl-2-pyrrolidinone (14.5 parts) is obtained as a crystalline solid. Recrystallization from toluene gives the pure sample, M.P. 103.5° to 105.5° C. The product contains 12.47% nitrogen (12.83% theoretical) and has a neutral equivalent of 226 (theoretical 218). The product has a formula of $C_{13}H_{18}N_2O$ and is identified as 5-phenylethylamino-5-methyl-2-pyrrolidinone.

The procedure of this example is most suitable for those hydroxylactams which dehydrate easily on heating or which are difficult to obtain in a high state of purity. It is particularly useful for and is used in the preparation of 5-cyclohexylamino-5-methyl-2-pyrrolidinone from cyclohexylamine and 5-hydroxy-5-methyl-2-pyrrolidinone and for 7abenzylamido-3,3-pentamethylene-2,3,3a,4,5,6,7,7a-octahydroindol-2-one from benzylamine and 7a-hydroxy-3,3 - pentamethylene-2,3,3a,4,5,6,7,7a-octahydroindol-2-one.

We claim:
1. A composition of matter having the formula

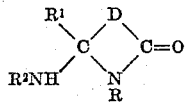

in which R is a member selected from the group consisting of hydrogen, alkyl of one to eighteen carbon atoms, phenyl, naphthyl, phenylalkyl of up to twelve carbon atoms, alkylphenylalkyl of up to twenty carbon atoms, alkoxyalkyl of three to ten carbon atoms, hydroxyalkyl of two to twelve carbon atoms and alkylaminoalkyl of three to eighteen carbon atoms,
   $R^1$ is a member of one to ten carbon atoms selected from the group consisting of alkyl, phenylalkyl, cycloalkyl, phenyl, naphthyl, and alkylphenyl,
   $R^2$ is a member having one to eighteen carbon atoms selected from the class consisting of alkyl, phenyl, naphthyl, and phenylalkyl and
   D is a divalent hydrocarbon chain containing two to three carbon atoms between the carbon atoms in the ring to which it is attached, the available valences of said two to three carbon atoms of said D are satisfied by members selected from the class consisting of hydrogen, alkyl having a total carbon atom content of up to eighteen and combinations of said hydrogen and said alkyl.

2. As a composition of matter, 5-benzylamino-3,3,5-trimethyl-2-pyrrolidinone.
3. As a composition of matter, 5-phenylethylamino-3,3,5-trimethyl-2-pyrrolidinone.
4. As a composition of matter, 5-phenylethylamino-5-methyl-2-pyrrolidinone.
5. As a composition of matter, 5-octylamino-3,3,5-trimethyl-2-pyrrolidinone.
6. As a composition of matter, 5-cyclohexylamino-3,3,5-trimethyl-2-pyrrolidinone.
7. A method for the preparation of the compound having the formula

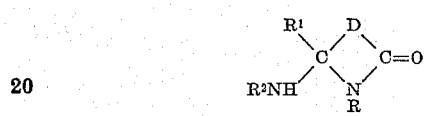

in which R is a member selected from the group consisting of hydrogen, alkyl of one to eighteen carbon atoms, phenyl, naphthyl, phenylalkyl of up to twelve carbon atoms, alkylphenylalkyl of up to ten carbon atoms, alkoxyalkyl of three to ten carbon atoms, hydroxyalkyl of two to twelve carbon atoms and alkylaminoalkyl of three to eighteen carbon atoms,
   $R^1$ is a member of one to ten carbon atoms selected from the group consisting of alkyl, phenylalkyl, cycloalkyl, phenyl, naphthyl, and alkylphenyl,
   $R^2$ is a member having one to eighteen carbon atoms selected from the class consisting of alkyl, phenyl, naphthyl, and phenylalkyl and
   D is a divalent hydrocarbon chain containing two to three carbon atoms between the carbon atoms in the ring to which it is attached, the available valences of said two to three carbon atoms of said D are satisfied by members selected from the class consisting of hydrogen, alkyl having a total carbon atom content of up to eighteen and combinations of said hydrogen and said alkyl, which comprises bringing together and thereby reacting at a temperature of about 35° to 150° C. in the presence of a basic catalyst the compound having the formula

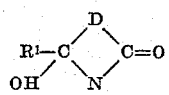

with a monoamine of one to eighteen carbon atoms having the formula $R^2NH_2$.

8. A method according to claim 7 in which the reaction temperature is in the range of about 50° to 150° C.

No references cited.